United States Patent [19]

Pieters et al.

[11] 4,224,293
[45] Sep. 23, 1980

[54] REMOVAL OF LOW CONCENTRATIONS OF HYDROGEN FROM CHLORINE GAS

[75] Inventors: Wim J. M. Pieters, Morristown; Franz Wenger, Mountainside, both of N.J.

[73] Assignee: Allied Chemical Corporation, Morris Township, Morris County, N.J.

[21] Appl. No.: 12,086

[22] Filed: Feb. 14, 1979

[51] Int. Cl.$^2$ .............................................. B01D 53/34
[52] U.S. Cl. ................................. 423/248; 423/241; 423/487; 423/500; 204/128
[58] Field of Search ............... 423/240, 241, 248, 487, 423/500, 502; 204/128

[56] References Cited

U.S. PATENT DOCUMENTS 1,166,524  1/1916  Ishikawa .............................. 423/500

OTHER PUBLICATIONS

Sommers, "The Chlor-Alkali Industry", Chem. Eng. Prog., vol. 61, No. 3, 1965, pp. 94 & 100–101.
"Chlorine", ACS Monograph, 1962, pp. 123–124 & 147–154.
Ullmans Encyclopaedie der Technischen Chemie, vol. 5, 1954, pp. 305–312.

*Primary Examiner*—Earl C. Thomas
*Attorney, Agent, or Firm*—Gerhard H. Fuchs; Ernest D. Buff

[57] ABSTRACT

Hydrogen contamination of chlorine-containing gas, such as the chlorine gas from the electrolytic chlorine/caustic process and especially the tail gas from the chlorine liquefaction operation, is eliminated by reaction of the hydrogen directly in the gas mixture at elevated temperature in the presence of a catalyst, to effect combination of the hydrogen with chlorine to form hydrogen chloride, followed by scrubbing of the hydrogen chloride from the gas.

11 Claims, No Drawings

REMOVAL OF LOW CONCENTRATIONS OF HYDROGEN FROM CHLORINE GAS

BACKGROUND OF THE INVENTION

In the electrolytic process for making alkali metal hydroxide and chlorine by electrolytic decomposition of alkali metal chloride in electrolytic cells, of both the diaphragm as well as the mercury type, the chlorine gas emerging from the cell is collected in a manifold under slight vacuum and ordinarily contains, besides water vapor and brine spray, small amounts of hydrogen from diaphragm diffusion or from amalgam-anolyte reactions, as well as small amounts of air sucked in through leakage in the equipment. Typically, the gas as obtained from the cells contains in the order of about 96 percent (by volume) of chlorine, 1 percent of hydrogen, and 3 percent of air (inerts). Often, additional air is introduced into the cell gas to maintain the hydrogen concentration in the tail gas from the following chlorine liquefaction operation below explosive limits, say below about 6 volume percent. After washing and drying, usually with sulfuric acid, the cell gas is compressed and cooled in a condenser to effect liquefaction of the chlorine. The unliquefied tail gas from the chlorine condenser, which ordinarily may comprise up to about 10 percent of the chlorine generated in the cells, contains enriched amounts of hydrogen and air. A typical tail gas composition may be, by volume: chlorine, 30 percent; air, 64 percent; and hydrogen, 6 percent. This tail gas cannot safely be compressed to higher pressure to condense additional amounts of chlorine because explosive conditions would develop due to increasing hydrogen concentration in the remaining tail gas as chlorine is condensed therefrom. Ordinarily, such tail gas is disposed of in the manufacture of by-products, such as hypochlorite bleach and chlorinated hydrocarbons. However, markets for such by-products do not always develop, and it would be desirable to recover additional amounts of chlorine from such tail gas.

The present invention has as its object selective removal of hydrogen from hydrogen-contaminated chlorine gas, such as the cell gas from the chlorine/caustic process, or the tail gas from liquefaction of chlorine from such cell gas. Tail gas from which hydrogen has been removed can thereafter be safely recompressed for recovery of additional liquefied chlorine.

SUMMARY OF THE INVENTION

In accordance with the present invention, hydrogen contamination of chlorine-containing gas such as the cell gas from the electrolytic chlorine/caustic process, or the tail gas from the chlorine liquefaction step in the electrolytic chlorine/caustic process, which gas contains less than about 6 percent by volume of hydrogen, is reduced by contacting said tail gas at temperature within the range of from about 200° to about 400° C. with a catalyst selected from the group consisting of manganese chloride; copper chloride; platinum; palladium; ruthenium; rhodium; alloys of platinum, palladium, ruthenium, and rhodium with each other; and mixtures thereof. In the presence of the catalyst, and while at temperature within the afore-stated range, the hydrogen contained in the gas reacts with chlorine to form hydrogen chloride. By this method it is possible to reduce the hydrogen content of the gas to levels of a few parts per million. The hydrogen chloride thus formed can be removed from the gas, as by scrubbing it with water, and the gas from which the hydrogen chloride has been removed can be safely recompressed to pressure of, say about 2 to about 20 atmospheres, and cooled to effect liquefaction and recovery of chlorine therefrom.

DETAILED DESCRIPTION OF THE INVENTION, OF THE PREFERRED EMBODIMENTS, AND OF THE BEST MODE PRESENTLY CONTEMPLATED FOR ITS PRACTICE

The hydrogen-contaminated chlorine gas, from which hydrogen is to be removed in accordance with the invention process will generally be derived from the electrolytic chlorine/caustic process, although its source is of no particular importance. It may, for example, be the cell gas from the chlorine/caustic process, or the tail gas from the chlorine liquefaction step in the electrolytic chlorine/caustic process. It may have been obtained by electrolytic decomposition of alkali metal chloride in electrolytic cells of any type, such as membrane, diaphragm, or mercury cells, or any other type of cell capable of decomposing alkali metal chloride under formation of gaseous chlorine. The chlorine gas generated in such cells is, after suitable washing and drying, compressed to pressure in the order of 2 to about 20 atmospheres, and is then passed through a condenser wherein it is cooled to temperature within the range of from about 0° to about −70° C. to effect liquefaction and separation of chlorine therefrom. The gas vented from the condenser is the tail gas of concern here. This tail gas ordinarily may contain, by volume, in the order of about 30 percent chlorine, up to about 65 percent of air, and up to about 6 percent of hydrogen. Such gas cannot be directly recompressed for recovery of additional chlorine. However, it can be subjected to hydrogen removal by the invention process directly as obtained from the condenser, although, if desired, it may prior to catalytic removal of hydrogen be subjected to any type of purification step. Following hydrogen removal, it can be safely recompressed.

Catalysts suitable for use in the invention process include copper chloride as well as transition metals selected from the group consisting of platinum, palladium, and rhodium, as well as alloys and mixtures of these transition metals with each other. These transition metal catalysts may be employed in any suitable form, for example in finely divided form supported on a suitable catalyst carrier, such as silicon dioxide or alumina. The manganese chloride and copper chloride catalyst are also desirably supported on any inert catalyst carrier, as is conventional, such as pumice, silica gel carriers or alumina carriers. The copper chloride catalyst may optionally be doped with one or more alkali metal chlorides and/or one or more chlorides of rare earth metals, including lanthanum, scandium, yttrium, zirconium and thorium. The above-described transition metal and copper chloride catalysts are conventional types of catalyst which are commercially available from several suppliers.

Ordinarily, it will be desirable to effect contact of the hydrogen-contaminated chlorine gas with the catalyst by passing the gas through a catalyst bed of suitable dimension and construction. The catalyst bed may be a stationary bed, or a porous bed of the supported catalyst. Alternatively, the catalyst may be in form of a fluidized bed through which the gas stream is passed.

The latter arrangement has the advantage of providing for improved temperature control in the reaction.

Contact time of the gas with the catalyst may range in the order of about 0.1 second to several hours, desirably between about 0.2 second and about 10 seconds. Ordinarily, substantially complete chlorination of the hydrogen will be obtained at contact times of from about 0.5 to about 5 seconds at temperatures within the range of from about 200° to about 300° when employing a palladium catalyst; or at temperatures within the range of from about 350° to about 450° C. when employing a copper chloride catalyst. Palladium and copper chloride are preferred catalysts. In general, preferred reaction temperatures for the transition metal catalyst, including palladium, range from about 100° to about 400° C., more preferably from about 200° to about 300° C. Preferred reaction temperatures for the copper chloride catalyst range from about 250° to about 450° C.

The following examples further illustrate the present invention.

catalyst had a surface area of 325 sq.m./g. The catalyst bed was maintained at a series of temperature points at the rate of one temperature point per hour. Steady state conditions were generally obtained within 15 minutes. Reactor feed gas as well as exit gas were subjected to gas chromatographic analysis. Four gas chromatographic detectors were employed. Analysis for hydrogen was carried out in argon as carried gas stream on a first gas chromatographic detector; oxygen was analyzed on a second detector with helium as carried gas; a third detector was used for analysis of chlorine; while a fourth detector was employed for internal reference. This system was capable of detecting hydrogen down to a level of about 12 ppm. The analysis for chlorine has a low level of accuracy, especially in the presence of moisture. The chlorine data presented in the tables below were calculated on the basis of the oxygen and hydrogen values. The results of two test runs are summarized in Table I below.

TABLE I

| CATALYST TEMP °C. | INLET GAS COMPOSITION % | | | EXIT GAS COMPOSITION % | | | CONVERSION % $H_2$ | CONVERSION %)* $O_2$ |
|---|---|---|---|---|---|---|---|---|
| | $H_2$ | $O_2$ | $Cl_2$ | $H_2$ | $O_2$ | $Cl_2$ | | |
| Run No. 1 | | | | | | | | |
| 215 | 2.65 | 1.70 | 95.7 | 2.74 | 1.81 | 95.5 | 0.0 | — |
| 230 | 2.71 | 1.70 | 95.6 | 2.86 | 1.70 | 95.4 | 0.0 | — |
| 245 | 2.73 | 1.80 | 95.5 | 2.75 | 1.82 | 95.4 | 0.0 | — |
| 262 | 2.70 | 1.99 | 95.3 | 2.59 | 1.87 | 95.5 | 6.0 | — |
| 280 | 2.66 | 1.75 | 95.6 | 2.39 | 1.80 | 95.8 | 11 | — |
| 295 | 2.83 | 1.56 | 95.6 | 2.24 | 1.67 | 96.1 | 21 | — |
| 311 | 2.68 | 1.81 | 95.3 | 1.56 | 1.62 | 96.8 | 42 | — |
| 325 | 2.68 | 1.92 | 95.4 | 1.03 | 1.73 | 97.2 | 62 | — |
| 344 | 2.69 | 1.69 | 95.6 | .41 | 1.71 | 97.9 | 85 | — |
| 360 | 2.60 | N.A. | N.A. | .03 | N.A. | N.A. | 99 | — |
| 375 | 2.70 | N.A. | N.A. | <12ppm | N.A. | N.A. | 100 | — |
| 390 | 2.73 | N.A. | N.A. | <12ppm | N.A. | N.A. | 100 | — |
| Run No. 2 | | | | | | | | |
| 331 | 3.18 | 1.69 | 95.1 | .32 | 1.71 | 97.9 | 90 | — |
| 344 | 3.19 | 1.70 | 95.1 | .009 | 1.76 | 98.1 | 97 | — |
| 355 | 3.09 | 1.75 | 95.2 | <12ppm | 1.80 | 98.2 | 100 | — |
| 365 | 3.03 | 1.80 | 95.2 | <12ppm | 1.73 | 98.3 | 100 | 4 |
| 377 | 3.05 | 1.69 | 95.3 | <12ppm | 1.59 | 98.4 | 100 | 6 |
| 390 | 3.15 | 1.67 | 95.2 | <12ppm | 1.60 | 98.4 | 100 | 4 |
| 410 | 3.15 | 1.66 | 95.2 | <12ppm | 1.53 | 98.5 | 100 | 8 |
| 435 | 2.96 | 1.71 | 95.3 | <12ppm | 1.20 | 98.8 | 100 | 30 |
| 412 | 3.12 | 1.65 | 95.2 | <12ppm | 1.30 | 98.7 | 100 | 21 |
| 386 | 2.94 | 1.61 | 95.5 | <12ppm | 1.46 | 98.5 | 100 | 9 |
| 371 | 2.94 | 1.21 | 95.8 | <12ppm | 1.35 | 98.7 | 100 | Neg.(?) |
| 361 | 2.91 | 1.76 | 95.3 | <12ppm | 1.45 | 98.6 | 100 | 17 |
| 350 | 2.91 | 1.76 | 95.3 | <12ppm | 1.43 | 98.6 | 100 | 17 |
| 330 | 2.97 | 1.70 | 95.3 | .21 | 1.50 | 98.5 | 93 | 12 |

)* conversion of $O_2$ with HCl formed by reaction of $H_2$ with $Cl_2$

EXAMPLE 1

A gas mixture predominantly comprising chlorine to which small amounts of hydrogen and oxygen had been added was passed at a gas flow rate of 30 ml/min. (based on standard temperature and pressure) through a KCl and $LaCl^3$-doped CuCl catalyst supported on fumed silica, in a catalyst bed of 4.5 ml volume containing 1.42 grams of the catalyst. Contact time of the gas with the catalyst was 2 seconds at reaction temperature. The

EXAMPLE 2

The procedure of Example 1 was repeated employing a palladium catalyst supported on activated alumina commercially available from Harshaw under the designation PD 0501. This catalyst had a surface area of about 186 sq.m./g., a pore size of 0.38 ml./g. and an approximate bulk density of 0.88 kg./l. The catalyst volume was 4.5 ml., residence time of the gas on the catalyst at reaction temperature was 2 seconds. The results of 2 runs are summarized below in Table II.

TABLE II

| CATALYST TEMP °C. | INLET GAS COMPOSITION VOL.% | | | EXIT GAS COMPOSITION VOL.% | | | CONVERSION % $H_2$ |
|---|---|---|---|---|---|---|---|
| | $H_2$ | $O_2$ | $Cl_2$ | $H_2$ | $O_2$ | $Cl_2$ | |
| Run No. 1 | | | | | | | |
| 87 | 3.77 | 1.22 | 95.6 | 3.27 | 1.43 | 95.3 | 0 |
| 105 | 3.25 | 1.56 | 95.2 | 3.13 | 1.40 | 95.5 | 1 |
| 120 | 3.21 | 1.58 | 95.2 | 2.88 | 1.60 | 95.5 | 8 |

TABLE II-continued

| CATALYST TEMP °C. | INLET GAS COMPOSITION VOL.% | | | EXIT GAS COMPOSITION VOL.% | | | CONVERSION % |
|---|---|---|---|---|---|---|---|
| | $H_2$ | $O_2$ | $Cl_2$ | $H_2$ | $O_2$ | $Cl_2$ | $H_2$ |
| 135 | 3.29 | 1.50 | 95.2 | 2.49 | 1.62 | 95.9 | 21 |
| 151 | 3.21 | 1.29 | 95.5 | 1.90 | 1.60 | 96.5 | 39 |
| 175 | 3.15 | 1.31 | 95.5 | 1.26 | 1.59 | 97.2 | 60 |
| 190 | 3.28 | 1.60 | 95.1 | 0.71 | 1.63 | 97.7 | 78 |
| 200 | 3.08 | 1.32 | 95.6 | 0.33 | 1.60 | 98.1 | 90 |
| 215 | 3.08 | 1.27 | 95.7 | 0.13 | 1.40 | 98.5 | 96 |
| 197 | 3.03 | 1.29 | 95.7 | 0.41 | 1.38 | 97.8 | 87 |
| 189 | 3.02 | 1.24 | 95.7 | 0.83 | 1.50 | 97.7 | 74 |
| 165 | 3.03 | 1.26 | 95.7 | 1.43 | 1.42 | 97.1 | 56 |
| 150 | 3.01 | 1.27 | 95.7 | 1.99 | 1.60 | 96.4 | 36 |
| 135 | 2.98 | 1.30 | 95.7 | 2.43 | 1.44 | 96.1 | 22 |
| Run No. 2 | | | | | | | |
| 87 | 2.95 | 1.45 | 95.6 | 2.97 | 1.40 | 95.6 | 0 |
| 105 | 2.95 | 1.47 | 95.6 | 2.88 | 1.41 | 95.7 | 2.8 |
| 120 | 2.90 | 1.62 | 95.5 | 2.71 | 1.48 | 95.8 | 8.5 |
| 135 | 2.92 | 1.67 | 95.4 | 2.40 | 1.45 | 96.2 | 19 |
| 151 | 2.90 | 1.55 | 95.6 | 1.99 | 1.46 | 96.6 | 34 |
| 165 | 2.09 | 1.68 | 95.4 | 1.48 | 1.45 | 97.1 | 50 |
| 105 | 2.92 | 1.85 | 95.2 | 0.91 | 1.53 | 97.6 | 69 |
| 200 | 2.95 | 1.78 | 95.3 | 0.41 | 1.54 | 98.1 | 86 |
| 215 | 2.98 | 1.67 | 95.4 | 0.15 | 1.58 | 98.3 | 95 |
| 228 | 3.09 | 1.80 | 95.1 | 0.15 | 1.55 | 98.4 | 95 |
| 230 | 2.95 | 1.69 | 95.4 | 0.03 | 1.57 | 98.4 | 99 |
| 250 | 2.97 | 1.42 | 95.6 | <12ppm | 1.47 | 98.5 | 100 |
| 265 | 3.16 | 1.67 | 05.2 | <12ppm | 1.55 | 98.4 | 100 |

Since various changes may be made in carrying out the process of our invention without departing from its scope and essential characteristics, all matter contained in the above description shall be interpreted as illustrative only, the scope of our invention being defined by the appended claims.

We claim:

1. The method of reducing hydrogen contamination of chlorine-containing gas contaminated with less than about 6 percent by volume of hydrogen, which comprises contacting said gas at temperature within the range of from about 100° to about 400° C. with a catalyst selected from the group consisting of copper chloride and palladium.

2. The method of claim 1 wherein the catalyst is palladium, and the gas is contacted with the catalyst at temperature within the range of from about 100° C. to about 300° C.

3. The method of claim 1 wherein the catalyst is a copper chloride catalyst, and the gas is contacted with the catalyst at temperature within the range of from about 250° to about 450° C.

4. The method of claim 1 wherein said hydrogen-contaminated chlorine-containing gas is the cell gas from the electrolytic chlorine/caustic process.

5. The method of claim 1 wherein said hydrogen-contaminated chlorine-containing gas is the tail gas from the chlorine liquefaction step in the electrolytic chlorine/caustic process.

6. The method of claim 5 wherein the catalyst is palladium, and wherein the gas is contacted with the catalyst at temperature within the range of from about 200° to about 300° C.

7. The method of claim 6 wherein the palladium catalyst is supported on activated alumina, and the gas is contacted with the catalyst for time period of from about 0.2 to about 10 seconds.

8. The method of claim 5 wherein the catalyst is a copper chloride catalyst, and wherein the gas is contacted with the catalyst at temperature within the range of from about 250° to about 450° C.

9. The method of claim 8 wherein the copper chloride catalyst is doped with a dopant selected from the group consisting of alkali metal chlorides and rare earth metal chlorides and mixtures thereof.

10. The method of claim 9 wherein the copper chloride catalyst is doped with KCl and LaCl₃.

11. The method of claim 10 wherein the copper catalyst is a Cu catalyst supported on fumed silica and doped with KCl and LaCl₃, and wherein the gas is contacted with the catalyst for time period of from about 0.2 to about 10 seconds.

* * * * *